(12) United States Patent
Herman

(10) Patent No.: US 12,249,782 B2
(45) Date of Patent: Mar. 11, 2025

(54) BUSHING GUARD WITH TERMINAL ADAPTER

(71) Applicant: Hubbell Incorporated, Shelton, CT (US)

(72) Inventor: Kyle Randy Herman, Lake Forest, CA (US)

(73) Assignee: Hubbell Incorporated, Shelton, CT (US)

( * ) Notice: Subject to any disclaimer, the term of this patent is extended or adjusted under 35 U.S.C. 154(b) by 371 days.

(21) Appl. No.: 17/730,884

(22) Filed: Apr. 27, 2022

(65) Prior Publication Data

US 2022/0352669 A1 Nov. 3, 2022

Related U.S. Application Data

(60) Provisional application No. 63/181,502, filed on Apr. 29, 2021.

(51) Int. Cl.
*H01R 13/506* (2006.01)
*H01R 13/629* (2006.01)

(52) U.S. Cl.
CPC ......... *H01R 13/506* (2013.01); *H01R 13/629* (2013.01)

(58) Field of Classification Search
CPC .... H01R 13/46; H01R 13/502; H01R 13/514; H01R 13/62; H01R 13/627; H01R 13/629; H01B 17/32; H01B 17/56; H01B 17/58; H01B 17/583

USPC ....................................................... 439/352
See application file for complete search history.

(56) References Cited

U.S. PATENT DOCUMENTS

| | | | |
|---|---|---|---|
| 4,707,562 A | 11/1987 | Whited | |
| 6,291,774 B1 | 9/2001 | Williams | |
| 6,995,313 B1* | 2/2006 | Barnett | H02G 7/05 |
| | | | 174/138 F |
| 2013/0220695 A1* | 8/2013 | Hiller | H01B 17/00 |
| | | | 174/138 R |
| 2016/0351305 A1* | 12/2016 | Hiller | H01B 17/00 |
| 2021/0313096 A1 | 10/2021 | Ehmann et al. | |

FOREIGN PATENT DOCUMENTS

WO 2020030429 A1 2/2020

OTHER PUBLICATIONS

International Search Report and Written Opinion for corresponding International (PCT) application No. PCT/US22/26512, 7 pages, dated Aug. 18, 2022.

* cited by examiner

*Primary Examiner* — Abdullah A Riyami
*Assistant Examiner* — Amara Anderson
(74) *Attorney, Agent, or Firm* — Ruggiero McAllister & McMahon LLC

(57) ABSTRACT

A guard assembly includes a main body that is sized to fit around insulator bushing equipment and forms an opening, and a plurality of faceplates that are interchangeable to connect to the main body and cover at least a portion of the opening.

20 Claims, 10 Drawing Sheets

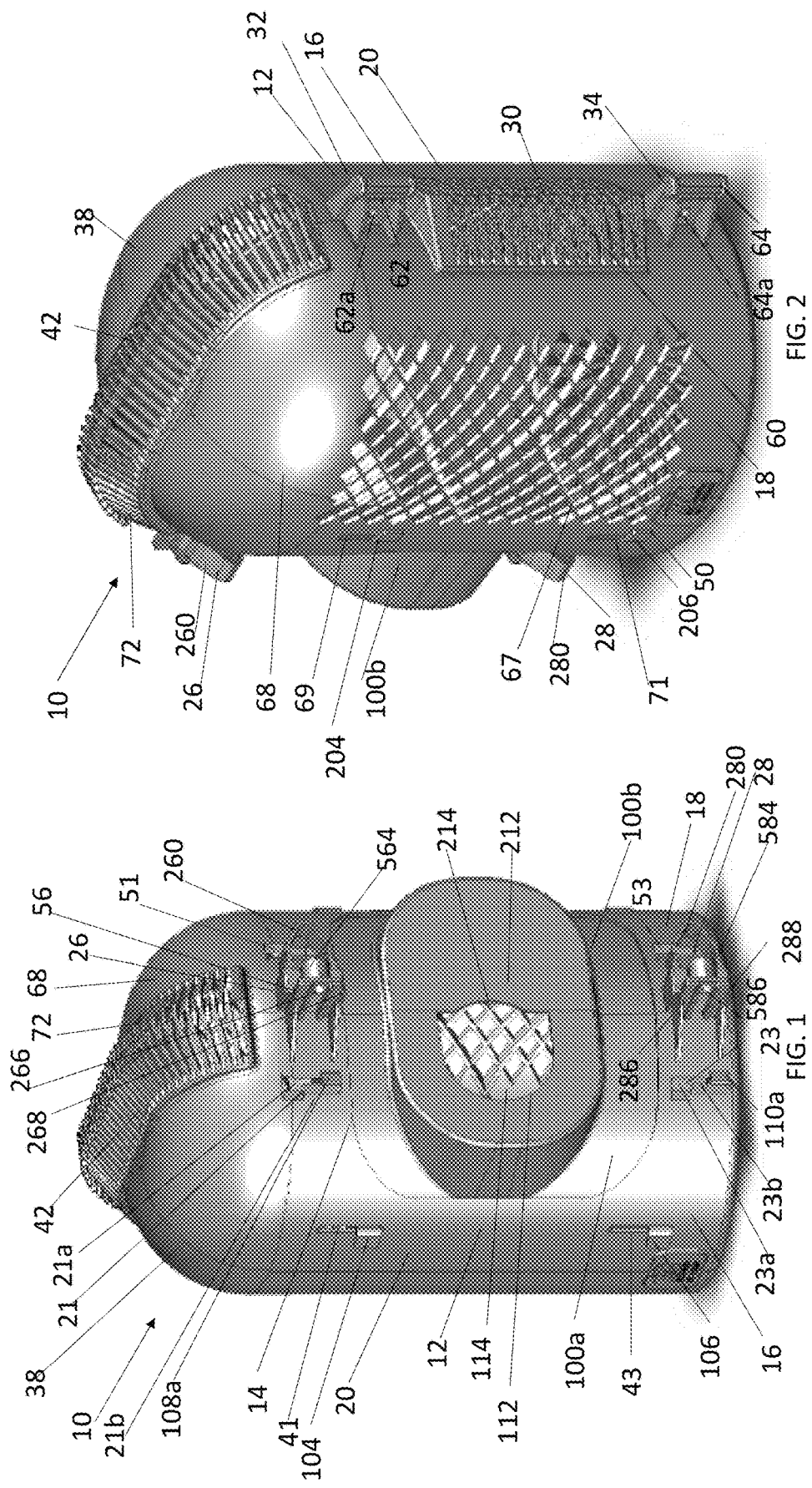

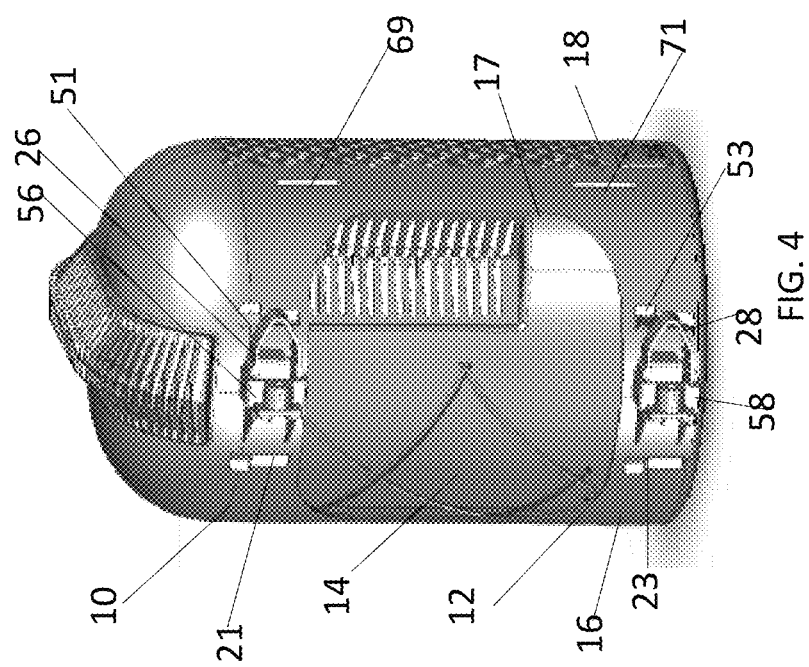
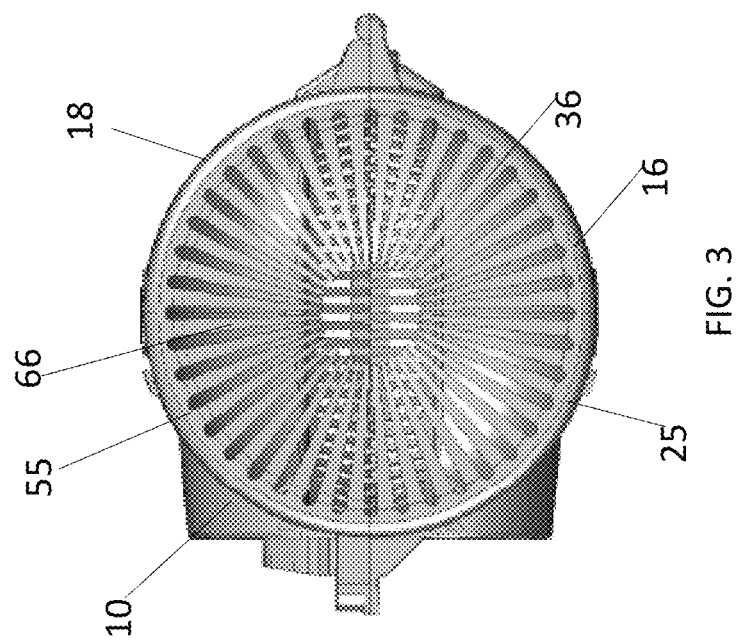

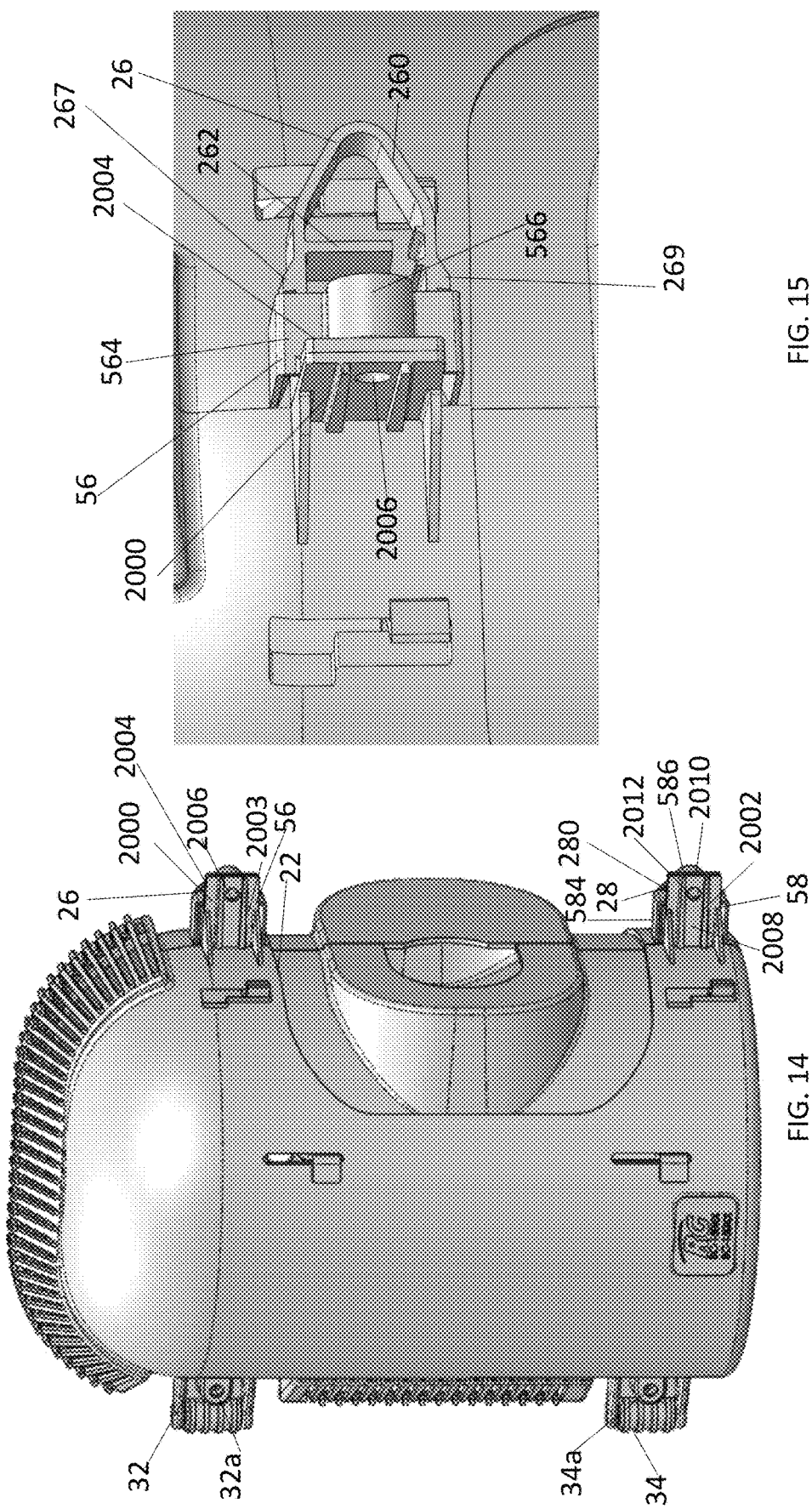

BUSHING GUARD WITH TERMINAL ADAPTER

CROSS REFERENCE TO RELATED APPLICATIONS

This application claims the benefit of U.S. Provisional Application 63/181,502 filed Apr. 29, 2021, the contents of which are incorporated by reference herein.

BACKGROUND

1. Field of the Invention

The present disclosure is related to guards used with insulator bushing equipment. More particularly, the present disclosure is related to a guard assembly having adapters so that the same guard assembly can be used with different insulator bushing equipment and terminal connectors.

2. Description of Related Art

Insulator bushing equipment can vary application by application. Utility providers typically specify which insulator bushings are required for proper electrical performance, but the connection points from those insulators to the conductor or voltage monitor are often unspecified and are decided by the linemen installing the equipment. When it comes time to guard the equipment post-installation, these connections are often unknown. Prior solutions typically resolve these unknown details by providing a very large guard as a "catch-all" to fit any possible configurations. That "solution" leaves a very sloppy fit, resulting in poor performance and often unsafe conditions. Other solutions rely on measuring equipment and providing a custom guard that would be very expensive and time consuming to create.

Accordingly, it has been determined by the present disclosure that there is a continuing need for a bushing guard assembly that overcomes, alleviates, and/or mitigates one or more of the aforementioned and other deleterious effects of prior devices.

SUMMARY

The present disclosure provides a guard assembly that includes a main body that is sized to fit around insulator bushing equipment and forms an opening, and a plurality of faceplates that are interchangeable to connect to the main body and cover at least a portion of the opening.

In some embodiments either alone or together with any one or more of the aforementioned and/or after-mentioned embodiments, the plurality of faceplates have a first faceplate and a second faceplate that are removably connectable to the main body.

In some embodiments either alone or together with any one or more of the aforementioned and/or after-mentioned embodiments, the first faceplate is connected adjacent the second faceplate to form a first opening having a first shape.

In some embodiments either alone or together with any one or more of the aforementioned and/or after-mentioned embodiments, a third faceplate and a fourth faceplate of the plurality of faceplates are removably connectable to the main body, and the third faceplate is connected adjacent the fourth faceplate to form a second opening having a second shape that is different than the first shape.

In some embodiments either alone or together with any one or more of the aforementioned and/or after-mentioned embodiments, the first faceplate has at least one first tab and the main body has at least one first slit, and the at least one first tab is removably received in the at least one first slit.

In some embodiments either alone or together with any one or more of the aforementioned and/or after-mentioned embodiments, the first faceplate has at least one first U-shape member and the main body has at least one first opening, and the at least one first U-shape member is removably received in the at least one first opening.

In some embodiments either alone or together with any one or more of the aforementioned and/or after-mentioned embodiments, the at least one first opening has an upper portion that is larger than a lower portion, and the at least one first U-shape member has a hook that is inserted into the upper portion and then moved into the lower portion.

In some embodiments either alone or together with any one or more of the aforementioned and/or after-mentioned embodiments, the main body has a first guard half and a second guard half that are connected by at least one hinge.

In some embodiments either alone or together with any one or more of the aforementioned and/or after-mentioned embodiments, the first guard half and the second guard half each have a sidewall that is cylindrical shape and a top wall that has a shape that is half of a hemisphere.

In some embodiments either alone or together with any one or more of the aforementioned and/or after-mentioned embodiments, the sidewall of the first guard half has a first curved edge and the sidewall of the second guard half has a second curved edge so that, when in the closed position, the first curved edge and the second curved edge form the opening in the main body.

A method of installing a guard assembly is also provided that includes providing a main body that is sized to fit around insulator bushing equipment having an opening; and connecting at least a first face plate of a plurality of faceplates in the opening of the main body, the plurality of faceplates being interchangeable to connect to the main body and cover at least a portion of the opening.

In some embodiments either alone or together with any one or more of the aforementioned and/or after-mentioned embodiments, the method further comprises connecting a second faceplate to the main body.

In some embodiments either alone or together with any one or more of the aforementioned and/or after-mentioned embodiments, the first faceplate is connected adjacent the second faceplate to form a first opening having a first shape.

In some embodiments either alone or together with any one or more of the aforementioned and/or after-mentioned embodiments, a third faceplate and a fourth faceplate of the plurality of faceplates are removably connectable to the main body, and the third faceplate is connected adjacent the fourth faceplate to form a second opening having a second shape that is different than the first shape.

In some embodiments either alone or together with any one or more of the aforementioned and/or after-mentioned embodiments, the first faceplate has at least one first tab and the main body has at least one first slit, and the at least one first tab is removably received in the at least one first slit.

In some embodiments either alone or together with any one or more of the aforementioned and/or after-mentioned embodiments, the first faceplate has at least one first U-shape member and the main body has at least one first opening, and the at least one first U-shape member is removably received in the at least one first opening.

In some embodiments either alone or together with any one or more of the aforementioned and/or after-mentioned embodiments, the at least one first opening has an upper portion that is larger than a lower portion, and the at least one first U-shape member has a hook that is inserted into the upper portion and then moved into the lower portion.

In some embodiments either alone or together with any one or more of the aforementioned and/or after-mentioned embodiments, the main body has a first guard half and a second guard half that are connected by at least one hinge.

In some embodiments either alone or together with any one or more of the aforementioned and/or after-mentioned embodiments, the first guard half and the second guard half each have a sidewall that is cylindrical shape and a top wall that has a shape that is half of a hemisphere.

In some embodiments either alone or together with any one or more of the aforementioned and/or after-mentioned embodiments, the sidewall of the first guard half has a first curved edge and the sidewall of the second guard half has a second curved edge so that, when in the closed position, the first curved edge and the second curved edge form the opening in the main body.

The above-described and other features and advantages of the present disclosure will be appreciated and understood by those skilled in the art from the following detailed description, drawings, and appended claims.

DESCRIPTION OF THE DRAWINGS

FIG. 1 is a front perspective view of an exemplary embodiment of a guard assembly of the present disclosure connected to a first adapter;

FIG. 2 is a rear perspective view of the guard assembly of FIG. 1 connected to the first adapter;

FIG. 3 is a bottom view of the guard assembly of FIG. 1 connected to the first adapter;

FIG. 4 is a front perspective view of the guard assembly of FIG. 1 having the first adapter removed;

FIG. 14 is a front perspective view of the guard assembly of FIG. 1 that is modified to replace tabs with a single tab having an aperture.

FIG. 15 is an enlarged, partial front perspective view of the guard assembly of FIG. 15.

DETAILED DESCRIPTION

Figure 5:
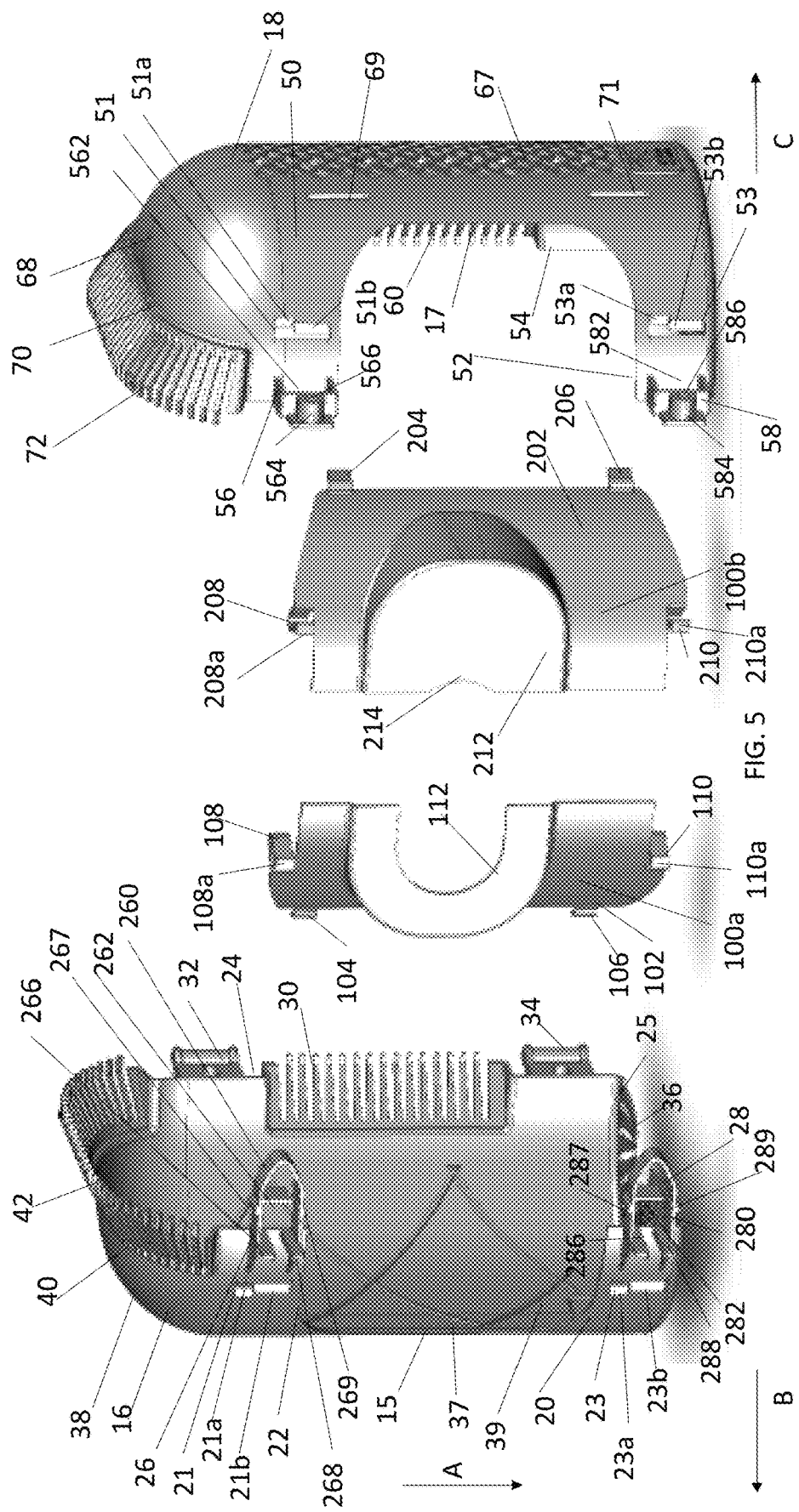
FIG. 5 is a front, perspective exploded view of the guard assembly of FIG. 1 and the first adapter.

Referring to the drawings and in particular to FIG. 1, an exemplary embodiment of a guard assembly according to the present disclosure is shown and is generally referred to by reference numeral 10. Guard assembly 10 fits over insulator bushing equipment to allow for at least partial isolation of high voltage equipment providing protection, for example, against incidental/momentary contact with the insulator bushing equipment by wildlife. Guard assembly 10 has a main body 12. Main body 12 has an opening 14. Opening 14 is sized to fit a variety of faceplate inserts such as first faceplate inserts 100a, 100b.

Advantageously, guard assembly 10 is a guard with an interchangeable adapter to which a variety of faceplate inserts, for example, first faceplate inserts 100a, 100b, can be installed in main body 12 to create a tight fit onto the insulator bushing equipment, without having to specify many details before installation. This tight fit of guard assembly 10 removes unnecessary slop and eliminates any gaps likely to create a dangerous shortage point.

Figure 6:
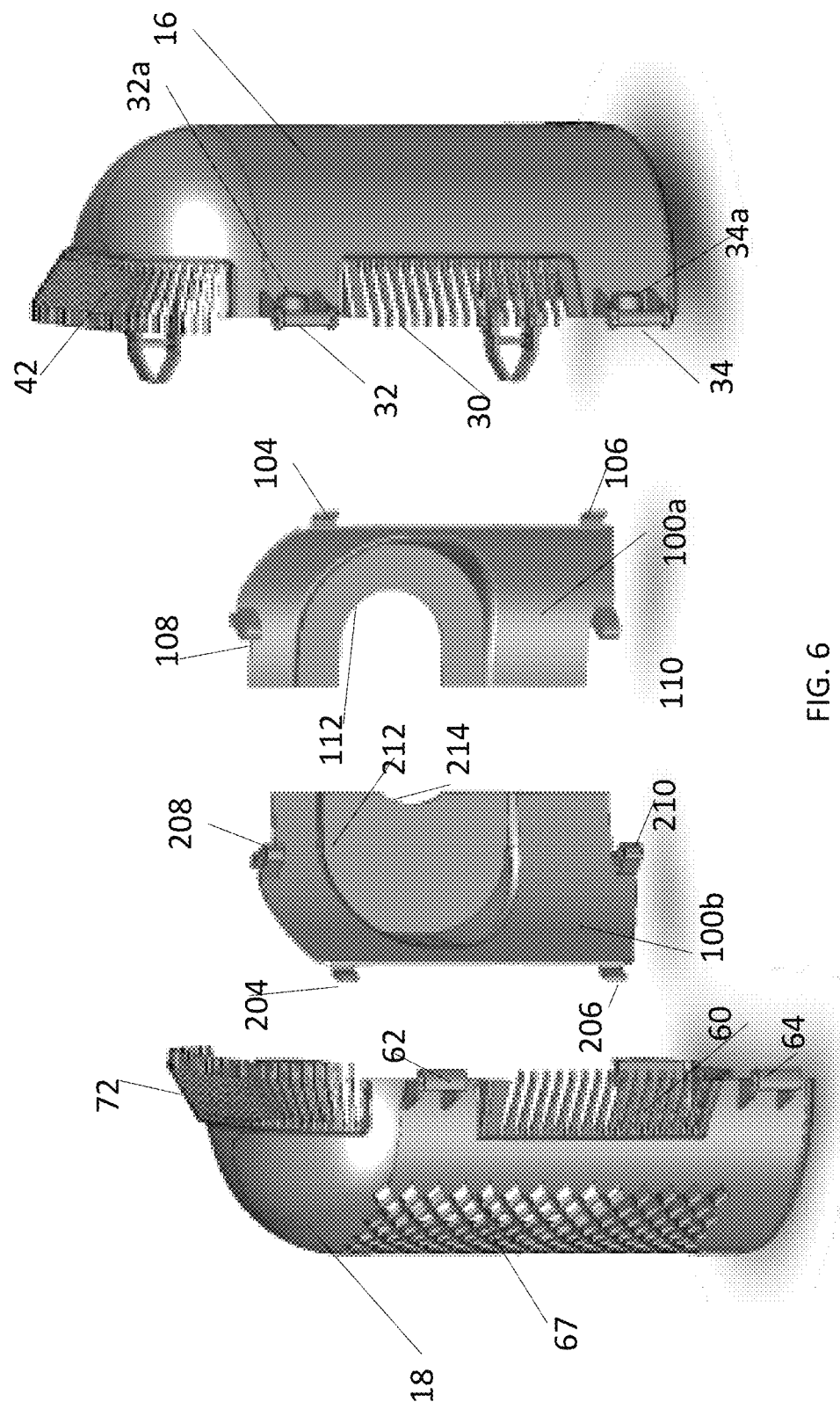
FIG. 6 is a rear, perspective exploded view of the guard assembly of FIG. 1 and the first adapter.

Referring to FIGS. 5 and 6, main body 10 has a first guard half 16 and a second guard half 18. First guard half 16 has a cylindrical side wall 20 that forms a first side edge 22 opposite a second side edge 24 and a bottom edge 25. First side edge 22 has a curved edge portion 15 that forms half of opening 14 that is between an upper closure member 26 and a lower closure member 28. Upper closure member 26 has a band 260 that forms a backwards C-shape that extends from first edge 22. A middle member 262 extends from a top of the backwards C-shape in a cantilever connection. Band 260 has bumps 267, 269. Upper closure member 26 also has two tabs 266, 268 that extend outward from first edge 22. Lower closure member 28 has a band 280 that forms a backwards C-shape that extends from first edge 22. A middle member 282 extends from a top of the backwards C-shape in a cantilever connection. Band 280 has bumps 287, 289. Lower closure member 28 also has two tabs 286, 288 that extend outward from first edge 22. Cylindrical side wall 20 has a first upper hole 21 above curved edge portion 15 and a first lower hole 23 below curved edge portion 15. First upper hole 21 has an upper portion 21a that is larger than a lower portion 21b. First lower hole 23 also has an upper portion 23a that is larger than a lower portion 23b. As shown in FIG. 1, first guard half 16 has a top slit 41 and a bottom slit 43 through cylindrical side wall 20. Referring back to FIGS. 5 and 6, second side edge 24 forms flexible projections 30 between an upper hinge member 32 and a lower hinge member 34. Flexible projections 36 extend from bottom edge 25. First guard half 16 has ribs 37 on an inner surface 39 of cylindrical side wall 20. A top wall 38 extends from cylindrical side wall 20. Top wall 38 is shaped as half of a hemisphere forming a top edge 40. Flexible projections 42 extend from top edge 40.

Figure 9:
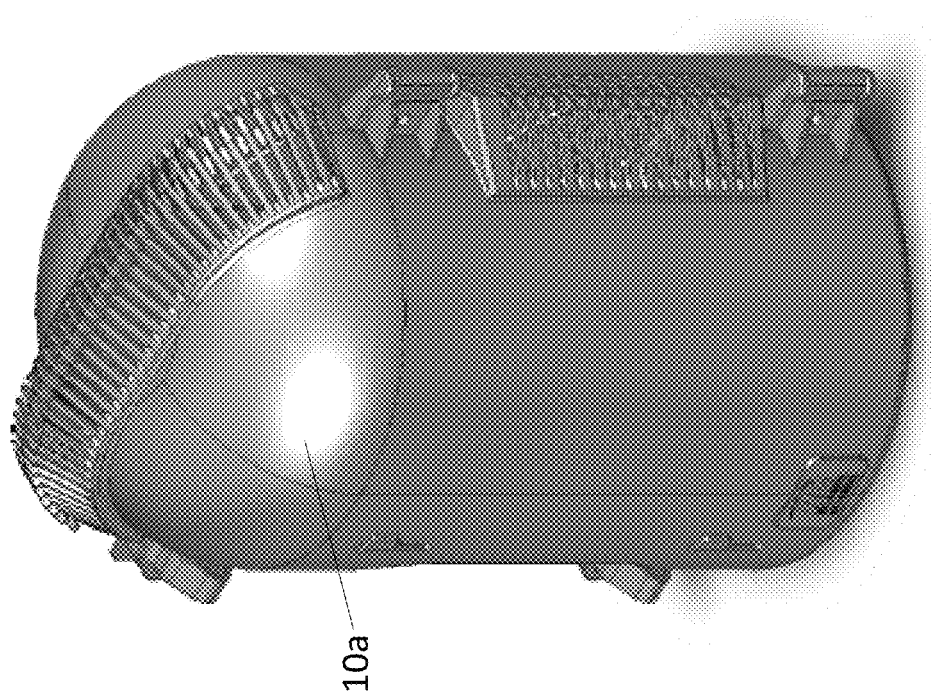
FIG. 9 is a rear perspective view of the guard assembly of FIG. 8 connected to the third adapter.
Figure 8:
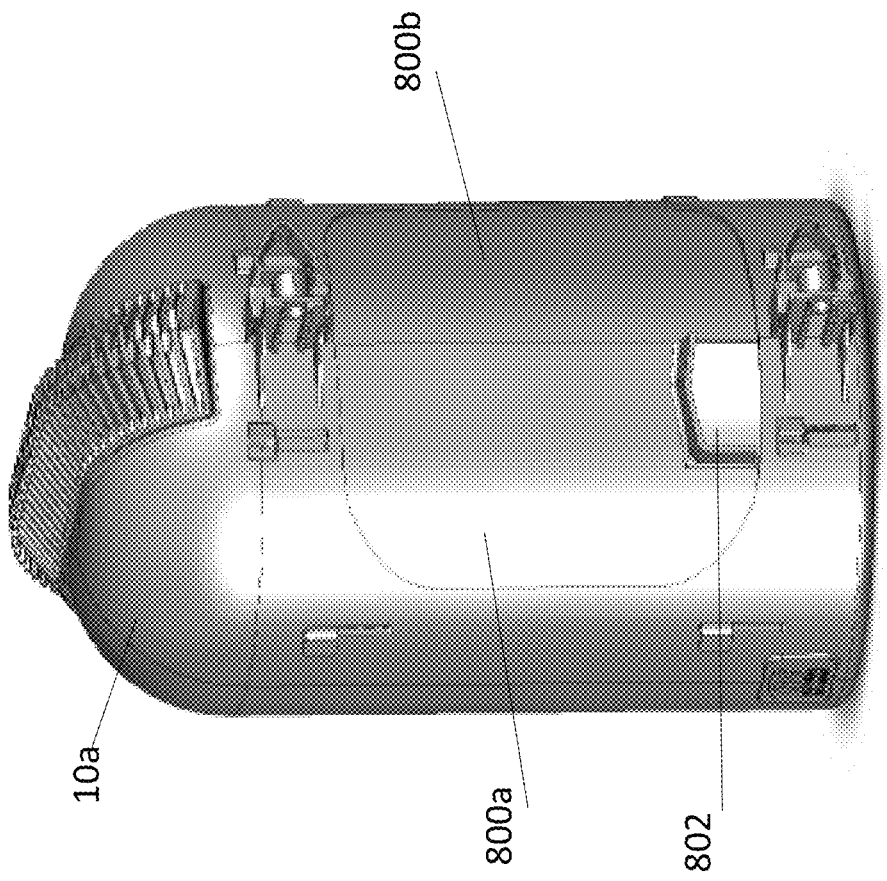
FIG. 8 is a front perspective view of a modified guard assembly of FIG. 1 connected to a third adapter.

Similarly, second guard half 18 has a cylindrical side wall 50 that forms a first side edge 52 opposite a second side edge 54, and, as shown in FIG. 3, a bottom edge 55. Referring back to FIGS. 5 and 6, first side edge 52 has a curved edge portion 17 that forms half of opening 14 that is between an upper receiving member 56 and a lower receiving member 58. Upper receiving member 56 forms a band opening 562 and an outer member 564 that forms an outer hole 566. Lower receiving member 58 forms a band opening 582 and an outer member 584 that forms an outer hole 586. Cylindrical side wall 50 has a first upper hole 51 above curved edge portion 17 and a first lower hole 53 below curved edge portion 17. First upper hole 51 has an upper portion 51a that is larger than a lower portion 51b. First lower hole 53 also has an upper portion 53a that is larger than a lower portion 53b. Second side edge 54 forms flexible projections 60 between, as shown in FIG. 6, an upper hinge member 62 and a lower hinge member 64. As shown in FIG. 3, flexible projections 66 extend from bottom edge 55. Referring back to FIGS. 5 and 6, second guard half 18 has a top slit 69 and a bottom slit 71 through cylindrical side wall 50. Second guard half 18 has side openings 67 through cylindrical side wall 50 forming a mesh portion. The mesh portion allows users to see inside of guard assembly 10 to assist with installation and removal. Alternatively, guard assembly 10 can be modified to guard assembly 10a that is the same as guard assembly 10 but has second guard half 18 that is modified to be free of side openings 67 as shown in FIGS. 8 and 9. Referring back to FIGS. 5 and 6, a top wall 68 extends from cylindrical side wall 50. Top wall 68 is shaped as half of a hemisphere forming a top edge 70. Flexible projections 72 extend from top edge 70.

First faceplate insert 100a has a face plate body 102. First faceplate insert 100a has an upper side tab 104 and a lower side tab 106 extending from face plate body 102. First faceplate insert 100a has an upper U-shape member 108 and a lower U-shape member 110 extending from face plate body 102. Upper U-shape member 108 has a hook 108a on an end that is opposite from face plate body 102 and lower U-shape member 110 has a hook 110a on an end that is opposite from face plate body 102. Face plate body 102 forms a C-shape 112.

Similarly, first faceplate insert 100b has a face plate body 202. First faceplate insert 100b has an upper side tab 204 and a lower side tab 206 extending from face plate body 202. First faceplate insert 100b has an upper U-shape member 208 and a lower U-shape member 210 extending from face plate body 202. Upper U-shape member 208 has a hook 208a on an end that is opposite from face plate body 202 and lower U-shape member 210 has a hook 210a on an end that is opposite from face plate body 202. Face plate body 202 forms a flat shape 212 having an indentation 214.

In operation, to install guard assembly 10 onto insulator bushing equipment with terminal connector, upper hinge member 32 of first guard half 16 connects to upper hinge member 62 of second guard half 18 and lower hinge member 34 of first guard half 16 connects to lower hinge member 64 of second guard half 18 forming a hinge connection allowing first guard half 16 and second guard half 18 to rotate relative to one another about the hinge connection. Upper hinge member 62 of second guard half 18 is a hook shape that snap fits over upper hinge member 32 of first guard half 16 that is a cylindrical shape. Lower hinge member 64 of second guard half 18 is a hook shape that snap fits over lower hinge member 34 of first guard half 16 that is a cylindrical shape.

Upper tab 104 of first faceplate insert 100a is inserted into top slit 41 of first guard half 16 and lower tab 106 is inserted into bottom slit 43 of first guard half 16. Hook 108a of upper U-shape member 108 is inserted through upper portion 21a of first upper hole 21 through first guard half 16. Hook 110a of lower U-shape member 110 is inserted through upper portion 23a of first lower hole 23 through first guard half 16. First faceplate insert 100a is moved downward in a direction A to move hook 108a of upper U-shape member 108 into lower portion 21b of first upper hole 21 and move hook 110a of lower U-shape member 110 into lower portion 23b of first lower hole 23. Top slit 41 and bottom slit 43 are a length to allow corresponding downward movement of upper tab 104 and lower tab 106, respectively, to move faceplate insert 100a in direction A. The U-shape of upper U-shape member 108 urges hook 108a of upper U-shape member 108 against cylindrical side wall 20 in a direction C while hook 108a of U-shape member 108 is in lower portion 21b of first upper hole 21 to maintain the connection of first faceplate insert 100a and first guard half 16. The U-shape of lower U-shape member 110 urges hook 110a of lower U-shape member 110 against cylindrical side wall 20 in a direction C while U-shape member 110 is in lower portion 23b of first lower hole 23 to maintain the connection of first faceplate insert 100a and first guard half 16.

Likewise, upper tab 204 of first faceplate insert 100b is inserted into top slit 69 of second guard half 18 and lower tab 206 is inserted into bottom slit 71 of second guard half 18. Hook 208a of upper U-shape member 208 is inserted through upper portion 51a of first upper hole 51 through second guard half 18. Hook 210a of lower U-shape member 210 is inserted through upper portion 53a of first lower hole 53 through second guard half 18. First faceplate insert 100b is moved downward in direction A to move hook 208a of upper U-shape member 208 into lower portion 51b of first upper hole 51 and move hook 210a of lower U-shape member 210 into lower portion 53b of first lower hole 53. Top slit 69 and bottom slit 71 are a length to allow corresponding downward movement of upper tab 204 and lower tab 206, respectively, to move faceplate insert 100b in direction A. The U-shape of upper U-shape member 208 urges hook 208a of upper U-shape member 208 against cylindrical side wall 50 in a direction B while U-shape member 208 is in lower portion 51b of first upper hole 51 to maintain the connection of first faceplate insert 100b and second guard half 18. The U-shape of lower U-shape member 210 urges hook 210a of lower U-shape member 210 against cylindrical side wall 50 in a direction B while U-shape member 208 is in lower portion 53b of first lower hole 53 to maintain the connection of first faceplate insert 100b and second guard half 18.

Each of upper side tab 104, lower side tab 106, upper U-shape member 108, lower U-shape member HO, upper side tab 204, lower side tab 206, upper U-shape member 208 and lower U-shape member 210 can be shaped so that they can only mate with their respective top slit 41, bottom slit 43, first upper hole 21, first lower hole 23, top slit 69, bottom slit 71, first upper hole 51 and first lower hole 53, to ensure correct assembly.

First guard half 16 and second guard half 18 can be placed on opposite sides of insulator bushing equipment with terminal connector and rotated towards each other so that upper closure member 26 is secured to upper receiving member 56 and lower closure member 28 is secured to lower receiving member 58 to secure first guard half 16 and second guard half 18 around the insulator bushing equipment with terminal connector when guard assembly 10 is in a closed position. To secure upper closure member 26 to upper receiving member 56, band 260 deforms to fit through band opening 562 of upper receiving member 56. A portion of band 260 passes through band opening 562 until bumps 267, 269 pass through opening 562 and outer member 564 abuts tabs 266, 268 securing band 260 to upper receiving member 56 by snap fit. Middle member 262 limits deformation of band 260. Although not required, a fastener, for example, a screw, can pass through outer hole 566 to further secure upper closure member 26 to upper receiving member 56. To secure lower closure member 28 to lower receiving member 58, band 280 deforms to fit through band opening 582 of lower receiving member 58. A portion of band 280 passes through band opening 582 until bumps 287, 289 pass through opening 582 and outer member 584 abuts tabs 286, 288 securing band 280 to lower receiving member 58 by snap fit. Middle member 282 limits deformation of band 280. Although not required, a fastener, for example, a screw, can pass through outer hole 586 to further secure lower closure member 28 to upper receiving member 58.

When guard assembly 10 is in a closed position as shown in FIG. 1, a portion of each of flexible projections 42 of first guard half 16 extend adjacent a portion of each of flexible projections 72 of second guard half 18 to allow a conductor to pass out of guard assembly 10 through flexible projections 42 and flexible projections 72 and a portion of each of flexible projections 30 of first guard half 16 extend adjacent a portion of each of flexible projections 60 of second guard half 18 to allow a conductor to pass out of guard assembly 10 through flexible projections 30 and flexible projections 60. Also, when guard assembly 10 is in a closed position, flexible projections 36 of first guard half 16 are adjacent flexible projections 66 of second guard half 18 to make a circular shape to allow a conductor to pass out of guard assembly 10 through flexible projections 36 and flexible projections 66.

Figure 10:
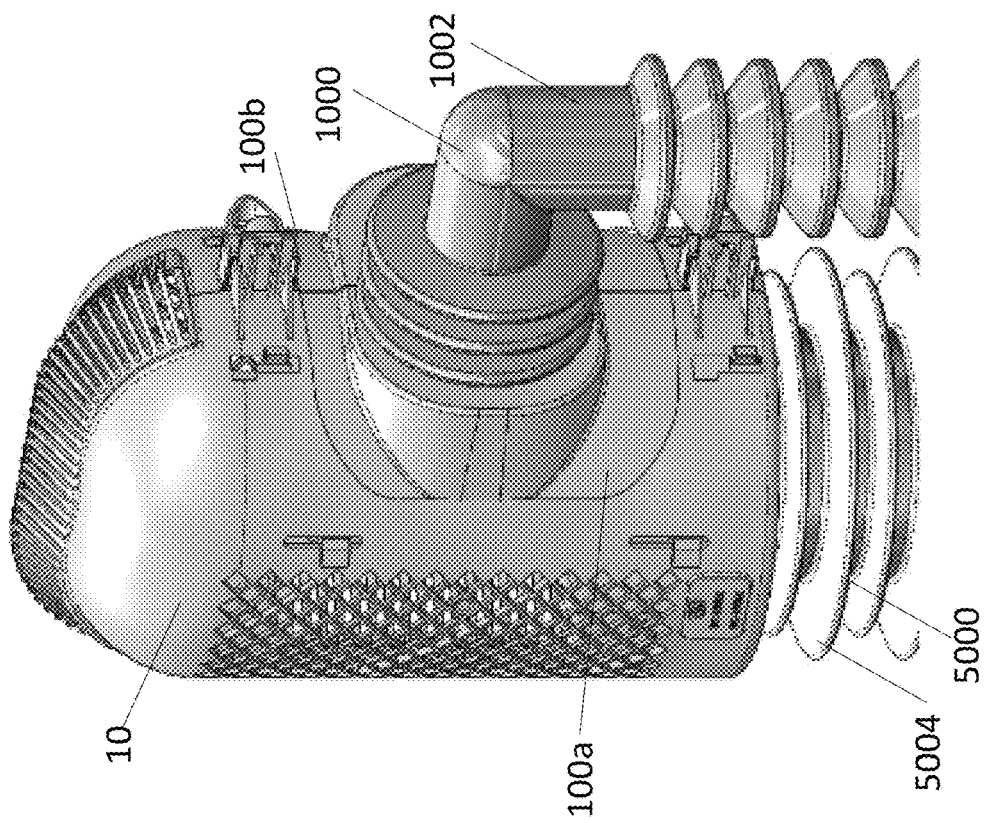
FIG. 10 is a front perspective view of the guard assembly of FIG. 1 connected to the first adapter and installed on first insulator bushing equipment with terminal connector.

When guard assembly 10 is in a closed position as shown in FIG. 1, first faceplate inserts 100a, 100b form opening 114. Referring to FIG. 10, first faceplate inserts 100a, 100b are sized and shaped for a specific terminal connector, for example, a first portion 1002 of first terminal connector 1000, to fit through opening 114. Guard assembly 10 also fits over first insulator bushing equipment 5000 that has a portion 5004 that extends through flexible projections 36 and flexible projections 66 out the bottom of guard assembly 10. Guard assembly 10 of FIG. 10 is modified to have openings 67 on both first guard half 16 and second guard half 18.

Figure 7:
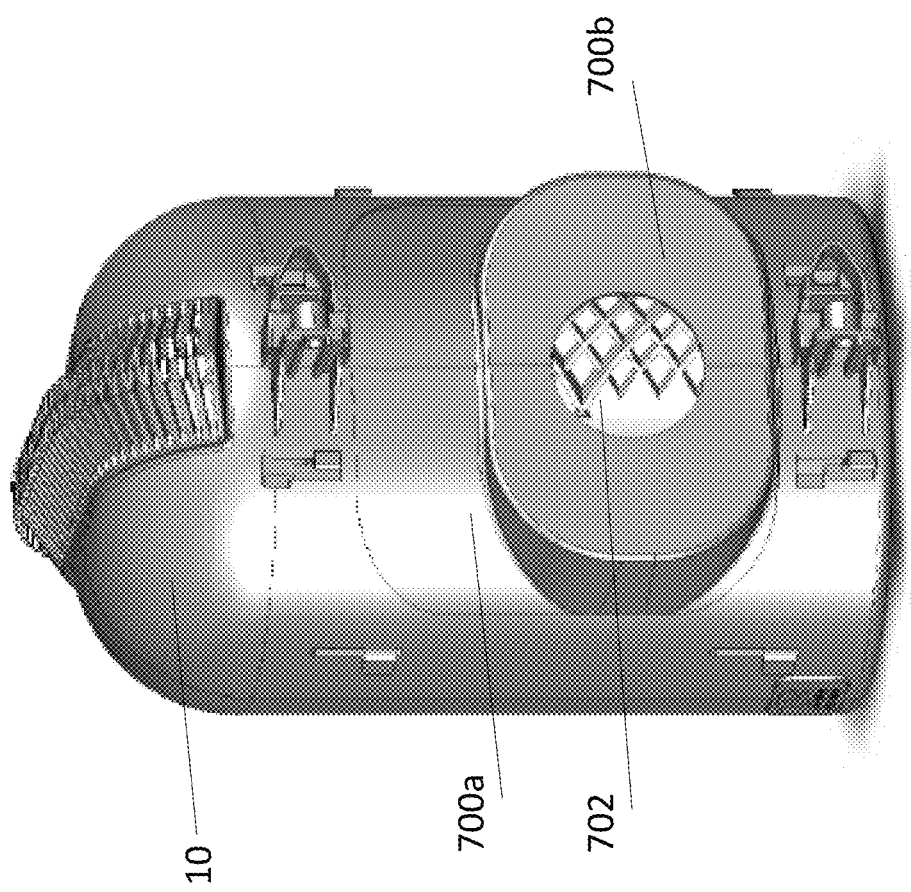
FIG. 7 is a front perspective view of the guard assembly of FIG. 1 connected to a second adapter.
Figure 11:
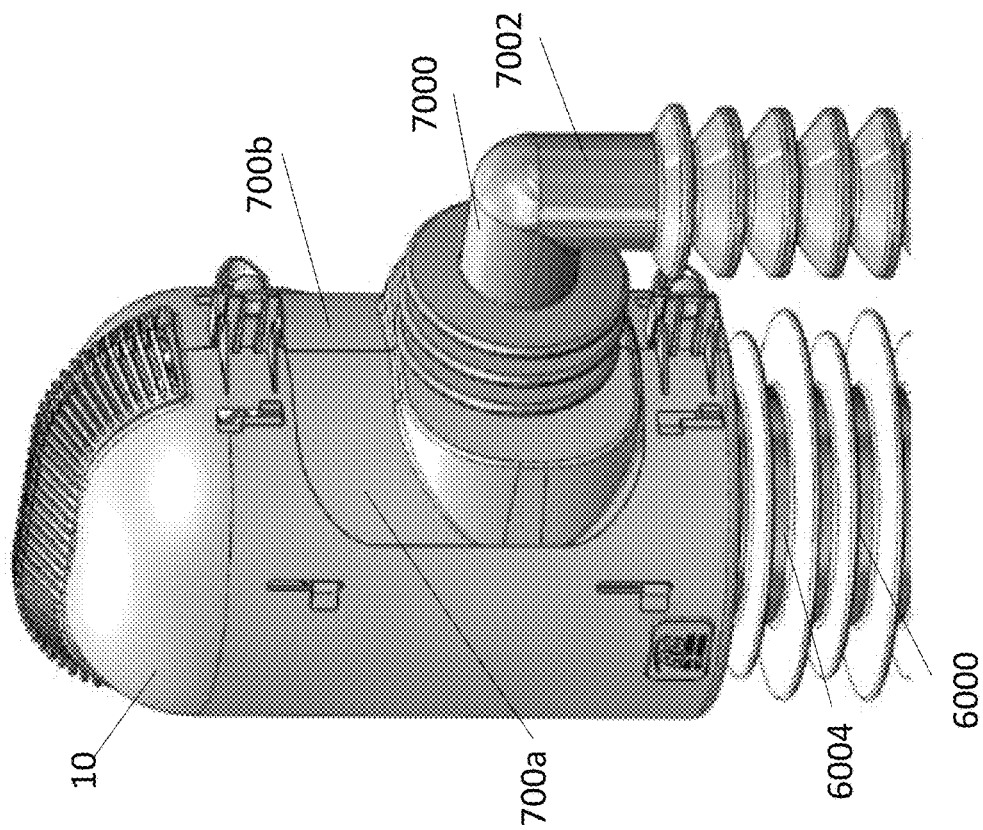
FIG. 11 is a front perspective view of the guard assembly of FIG. 1 connected to the second adapter of FIG. 7 installed on second insulator bushing equipment with terminal connector.
Figure 13:
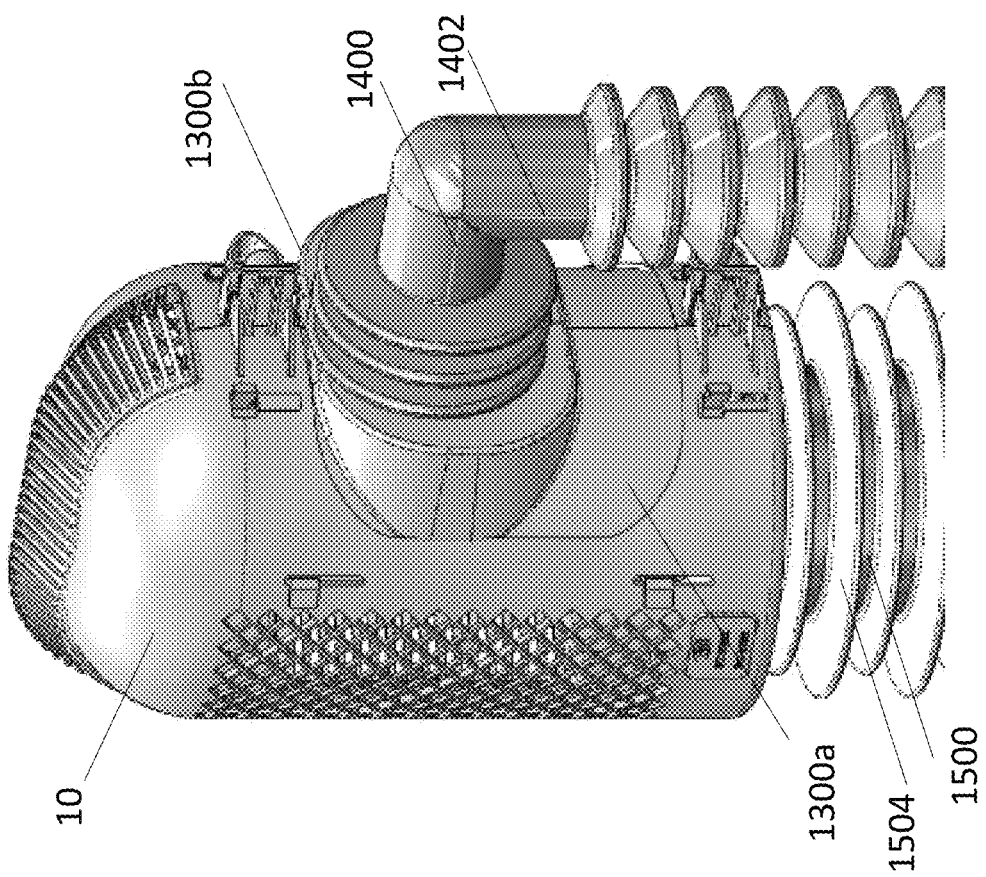
FIG. 13 is a front perspective view of the guard assembly of FIG. 1 connected to a fourth adapter installed on fourth insulator bushing equipment with terminal connector.
Figure 12:
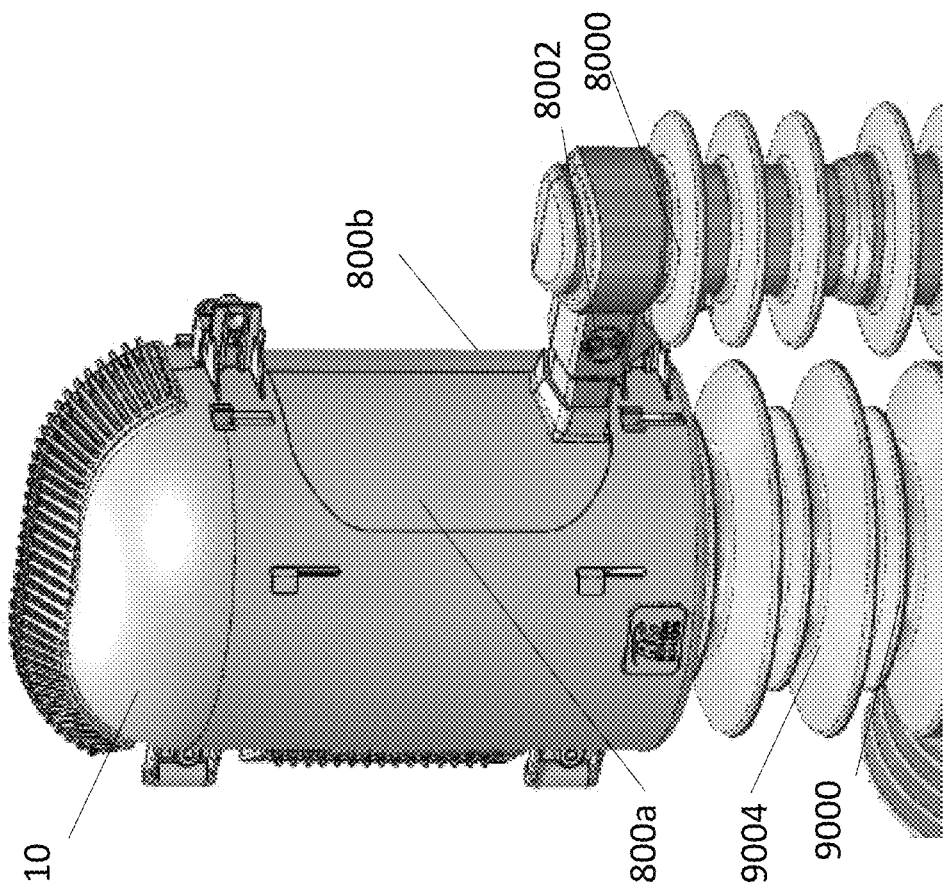
FIG. 12 is a front perspective view of the guard assembly of FIG. 1 connected to the third adapter of FIG. 8 installed on third insulator bushing equipment with terminal connector.

First guard half 16 and second guard half 18 can connect with faceplate inserts other than first faceplate inserts 100a, 100b. The other faceplate inserts are the same as first faceplate inserts 100a, 100b except form different openings than opening 114. For example, FIG. 7 includes second faceplate inserts 700a, 700b that form an opening 702. Referring to FIG. 11, second faceplate inserts 700a, 700b are sized and shaped for specific terminal connector equipment, for example, a first portion 7002 of second terminal connector 7000, to fit through opening 702. Guard assembly 10 also fits over second insulator bushing equipment 6000 that has a portion 6004 that extends through flexible projections 36 and flexible projections 66 out the bottom of guard assembly 10. In addition, FIGS. 8 and 9 include third faceplate inserts 800a, 800b that form an opening 802. Referring to FIG. 12, third faceplate inserts 800a, 800b are sized and shaped for specific terminal connector equipment, for example, a first portion 8002 of third terminal connector 8000, to fit through opening 802. Guard assembly 10 also fits over third insulator bushing equipment 9000 that has a portion 9004 that extends through flexible projections 36 and flexible projections 66 out the bottom of guard assembly 10. Another example is shown in FIG. 13, fourth faceplate inserts 1300a, 1300b are sized and shaped for specific terminal connector equipment, for example, a first portion 1402 of fourth terminal connector 1400, to fit through an opening through fourth faceplate inserts 1300a, 1300b. Guard assembly 10 also fits over fourth insulator bushing equipment 1500 that has a portion 1504 that extends through flexible projections 36 and flexible projections 66 out the bottom of guard assembly 10.

Guard assembly 10 has main body 12 that has opening 14 sized to fit a variety of faceplate inserts. Main body 12 also has attachment features which join the faceplates to main body 12, namely, upper side tab 104, lower side tab 106, upper U-shape member 108, lower U-shape member 110, upper side tab 204, lower side tab 206, upper U-shape member 208 and lower U-shape member 210. These snap-in-faceplates are allowed freedom of movement vertically by the shape of first upper hole 21, first lower hole 23, top slit 41, bottom slit 43, first upper hole 51, first lower hole 53, top slit 69 and bottom slit 71, which aids in the variability of the guard. The various terminal adapter faceplates coincide with specific terminal connector equipment. To install guard assembly 10, faceplates, for example, first faceplate inserts 100a, 100b, are attached to each of first guard half 16 and second guard half 18, respectively. First guard half 16 and second guard half 18 are hinged together to form a joint over the terminals/equipment, providing a tight fit around their exit from guard assembly 10. Guard assembly 10 can be a kit with numerous faceplates included, so that during installation the installer can pick which faceplate works best for their unique application. Alternatively, guard assembly 10 can only include one set of faceplates.

Referring to FIGS. 14 and 15, guard assembly 10 can be modified to replace two tabs 266, 268 with a single upper tab 2000 and replace two tabs 286, 288 with a single lower tab 2002. Single upper tab 2000 extends outward from first edge 22. Single upper tab 2000 has a front surface 2003 and a rear surface 2004 that is opposite front surface 2002. Single upper tab 2000 has an aperture 2006 that extends through front surface 2002 and rear surface 2004. Similarly, single lower tab 2002 extends outward from first edge 22. Single lower tab 2002 has a front surface 2008 and a rear surface 2010 that is opposite front surface 2008. Single lower tab 2002 has an aperture 2012 that extends through front surface 2008 and rear surface 2010.

In operation, to secure upper closure member 26 to upper receiving member 56, band 260 deforms to fit through band opening 562 of upper receiving member 56. A portion of band 260 passes through band opening 562 until bumps 267, 269 pass through opening 562 and outer member 564 abuts single upper tab 2000 securing band 260 to upper receiving member 56 by snap fit and aligning aperture 2006 with outer hole 566. Middle member 262 limits deformation of band 260. Similarly, to secure lower closure member 28 to lower receiving member 58, band 280 deforms to fit through band opening 582 of lower receiving member 58. A portion of band 280 passes through band opening 582 until bumps 287, 289 pass through opening 582 and outer member 584 abuts single lower tab 2002 securing band 280 to lower receiving member 58 by snap fit and aligning aperture 2012 with outer hole 586. Middle member 282 limits deformation of band 280.

Figures 16, 17:
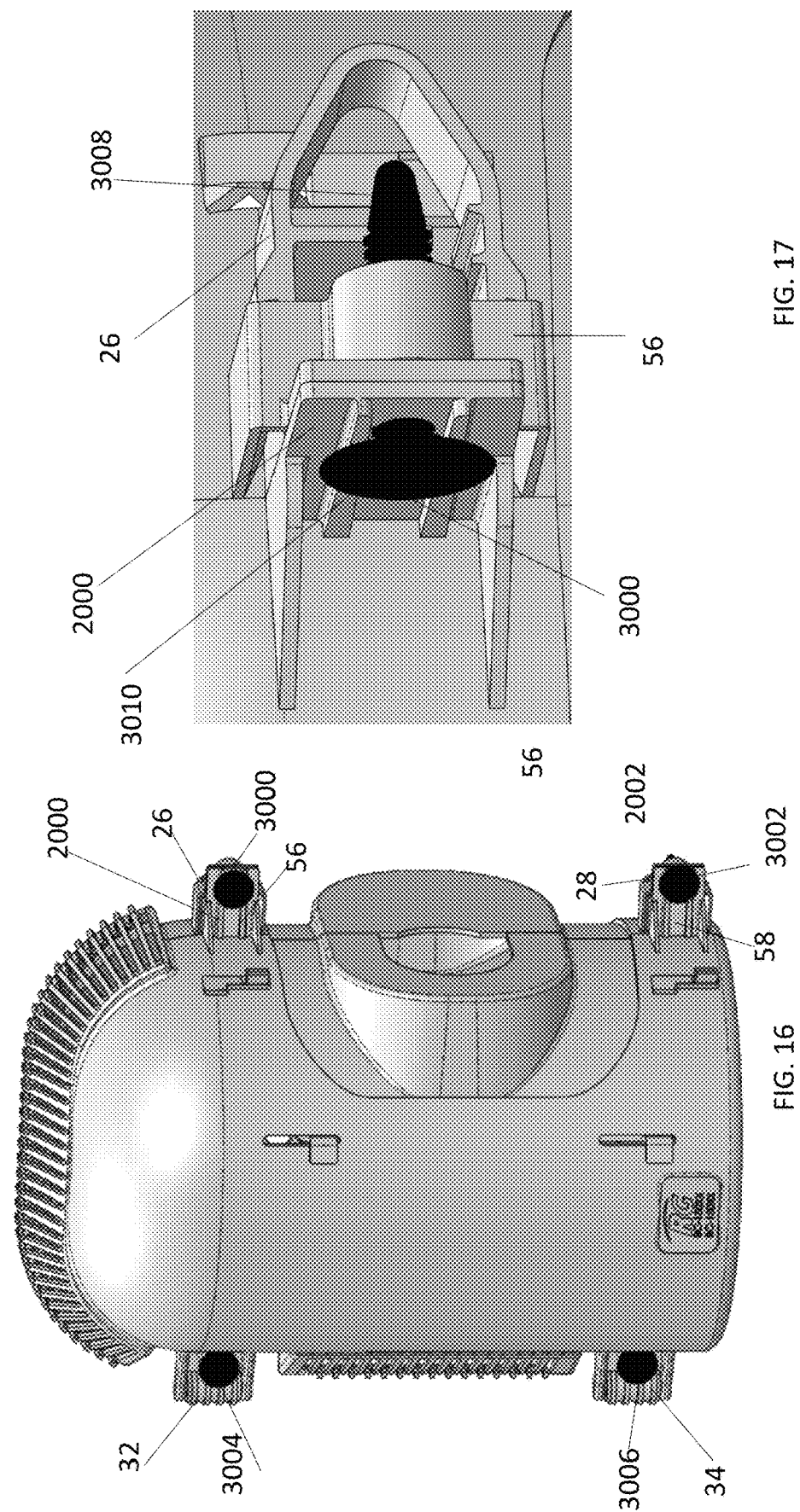
FIG. 16 is a front perspective view of the guard assembly of FIG. 14 connected to pushpins.
FIG. 17 is an enlarged, partial front perspective view of the guard assembly of FIG. 16.

Referring to FIGS. 16 and 17, a fastener 3000, for example, a screw or pushpin, can pass through outer hole 566 and aperture 2006 to further secure upper closure member 26 to upper receiving member 56. In addition, a fastener 3002, for example, a screw or pushpin, can pass through outer hole 586 and aperture 2012 to further secure lower closure member 28 to upper receiving member 58. Referring to FIGS. 2 and 14, upper hinge member 32 also has an aperture 32a, lower hinge member 34 has an aperture 34a, upper hinge member 62 has an aperture 62a and lower hinge member 64 has an aperture 64a so that upper hinge member 32 of first guard half 16 connects to upper hinge member 62 of second guard half 18 and a fastener 3004, for example, a screw or pushpin, passes through aperture 32*a* of upper hinge member 32 and aperture 62*a* of upper hinge member 62. Another fastener 3006, for example, a screw or pushpin, passes through aperture 34*a* of lower hinge member 34 and aperture 64*a* of lower hinge member 64 to maintain the hinge connection allowing first guard half 16 and second guard half 18 to rotate relative to one another about the hinge connection. Referring to FIG. 17, each of fasteners 3000, 3002, 3004, 3006 can be a pushpin having a body 3008 connected to a head 3010. If head 3010 is removed or snipped from body 3008, then each of fasteners 3000, 3002, 3004, 3006 that are pushpins can be removed. Advantageously, guard assembly 10 can pass a wind test without fasteners 3000, 3002, 3004, 3006 that are pushpins. Another advantage is that guard assembly 10 can be pre-loaded with fasteners 3000, 3002, 3004, 3006 that are pushpins installed on guard assembly 10.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

| PARTS LIST | |
| --- | --- |
| guard assembly | 10 |
| main body | 12 |
| opening | 14 |
| curved edge portion | 15 |
| first guard half | 16 |
| second guard half | 18 |
| curved edge portion | 17 |
| cylindrical side wall | 20 |
| first upper hole | 21 |
| upper portion | 21a |
| lower portion | 21b |
| first side edge | 22 |
| first lower hole | 23 |
| upper portion | 23a |
| lower portion | 23b |
| second side edge | 24 |
| bottom edge | 25 |
| upper closure member | 26 |
| lower closure member | 28 |
| flexible projections | 30 |
| upper hinge member | 32 |
| aperture | 32a |
| lower hinge member | 34 |
| aperture | 34a |
| flexible projections | 36 |
| ribs | 37 |
| top wall | 38 |
| inner surface | 39 |
| top edge | 40 |
| flexible projections | 42 |
| top slit | 41 |
| flexible projections | 42 |
| bottom slit | 43 |

| PARTS LIST -continued | |
| --- | --- |
| cylindrical side wall | 50 |
| first upper hole | 51 |
| upper portion | 51a |
| lower portion | 51b |
| first side edge | 52 |
| first lower hole | 53 |
| upper portion | 53a |
| lower portion | 53b |
| second side edge | 54 |
| upper receiving member | 56 |
| lower receiving member | 58 |
| flexible projections | 60 |
| upper hinge member | 62 |
| aperture | 62a |
| lower hinge member | 64 |
| aperture | 64a |
| flexible projections | 66 |
| side openings | 67 |
| top wall | 68 |
| top slit | 69 |
| bottom slit | 71 |
| flexible projections | 72 |
| first faceplate inserts | 100a, 100b |
| face plate body | 102 |
| upper side tab | 104 |
| lower side tab | 106 |
| upper U-shape member | 108 |
| hook | 108a |
| lower U-shape member | 110 |
| hook | 110a |
| C-shape | 112 |
| opening | 114 |
| face plate body | 202 |
| upper side tab | 204 |
| lower side tab | 206 |
| upper U-shape member | 208 |
| hook | 208a |
| lower U-shape member | 210 |
| hook | 210a |
| flat shape | 212 |
| indentation | 214 |
| band | 260 |
| middle member | 262 |
| two tabs | 266, 268 |
| bumps | 267, 269 |
| band | 280 |
| middle member | 282 |
| two tabs | 286, 288 |
| bumps | 287, 289 |
| band opening | 562 |
| outer member | 564 |
| outer hole | 566 |
| band opening | 582 |
| outer member | 584 |
| outer hole | 586 |
| second faceplate inserts | 700a, 700b |
| opening | 702 |
| third faceplate inserts | 800a, 800b |
| opening | 802 |
| first portion | 1002 |
| first terminal connector | 1000 |
| single upper tab | 2000 |
| single lower tab | 2002 |
| front surface | 2003 |
| rear surface | 2004 |
| aperture | 2006 |
| front surface | 2008 |
| rear surface | 2010 |
| aperture | 2012 |
| fasteners | 3000, 3002, 3004, 3006 |
| body | 3008 |
| head | 3010 |
| first insulator bushing equipment | 5000 |
| portion | 5004 |
| second insulator bushing equipment | 6000 |
| portion | 6004 |
| first portion | 7002 |

PARTS LIST

| | |
|---|---|
| second terminal connector | 7000 |
| first portion | 8002 |
| third terminal connector | 8000 |
| third insulator bushing equipment | 9000 |
| portion | 9004 |
| fourth faceplate inserts | 1300a, 1300b |
| first portion | 1402 |
| fourth terminal connector | 1400 |
| fourth insulator bushing equipment | 1500 |
| portion | 1504 |

What is claimed is:

1. A guard assembly comprising:
a main body that is sized to fit around insulator bushing equipment and forms an opening;
a plurality of faceplates that are interchangeable to connect to the main body and cover at least a portion of the opening, wherein the plurality of faceplates are interchangeable to form different shaped openings.

2. The guard assembly of claim 1, wherein the plurality of faceplates has a first faceplate and a second faceplate that are removably connectable to the main body.

3. The guard assembly of claim 2, wherein the first faceplate is connected adjacent the second faceplate to form a first opening having a first shape.

4. The guard assembly of claim 2, wherein the first faceplate has at least one first tab and the main body has at least one first slit, and wherein the at least one first tab is removably received in the at least one first slit.

5. The guard assembly of claim 2, wherein the first faceplate has at least one first U-shape member and the main body has at least one first opening, and wherein the at least one first U-shape member is removably received in the at least one first opening.

6. The guard assembly of claim 5, wherein the at least one first opening has an upper portion that is larger than a lower portion, and wherein the at least one first U-shape member has a hook that is inserted into the upper portion and then moved into the lower portion.

7. The guard assembly of claim 1, wherein the main body has a first guard half and a second guard half that are connected by at least one hinge.

8. The guard assembly of claim 7, wherein the first guard half and the second guard half each have a sidewall that is cylindrical shape and a top wall that has a shape that is half of a hemisphere.

9. The guard assembly of claim 8, wherein the sidewall of the first guard half has a first curved edge and the sidewall of the second guard half has a second curved edge so that, when in the closed position, the first curved edge and the second curved edge form the opening in the main body.

10. A guard assembly comprising:
a main body that is sized to fit around insulator bushing equipment and forms an opening;
a plurality of faceplates that are interchangeable to connect to the main body and cover at least a portion of the opening, wherein the plurality of faceplates has a first faceplate and a second faceplate that are removably connectable to the main body, wherein the first faceplate is connected adjacent the second faceplate to form a first opening having a first shape, wherein a third faceplate and a fourth faceplate of the plurality of faceplates are removably connectable to the main body, and wherein the third faceplate is connected adjacent the fourth faceplate to form a second opening having a second shape that is different than the first shape.

11. A method of installing a guard assembly, the method comprising:
providing a main body that is sized to fit around insulator bushing equipment having an opening;
connecting at least a first face plate of a plurality of faceplates in the opening of the main body, the plurality of faceplates being interchangeable to connect to the main body and cover at least a portion of the opening, wherein the plurality of faceplates are interchangeable to form different shaped openings.

12. The method of claim 11, further comprising connecting a second faceplate to the main body.

13. The method of claim 12, wherein the first faceplate is connected adjacent the second faceplate to form a first opening having a first shape.

14. The method of claim 12, wherein the first faceplate has at least one first tab and the main body has at least one first slit, and wherein the at least one first tab is removably received in the at least one first slit.

15. The method of claim 12, wherein the first faceplate has at least one first U-shape member and the main body has at least one first opening, and wherein the at least one first U-shape member is removably received in the at least one first opening.

16. The method of claim 15, wherein the at least one first opening has an upper portion that is larger than a lower portion, and wherein the at least one first U-shape member has a hook that is inserted into the upper portion and then moved into the lower portion.

17. The method of claim 11, wherein the main body has a first guard half and a second guard half that are connected by at least one hinge.

18. The method of claim 17, wherein the first guard half and the second guard half each have a sidewall that is cylindrical shape and a top wall that has a shape that is half of a hemisphere.

19. The method of claim 18, wherein the sidewall of the first guard half has a first curved edge and the sidewall of the second guard half has a second curved edge so that, when in the closed position, the first curved edge and the second curved edge form the opening in the main body.

20. A method of installing a guard assembly, the method comprising:
providing a main body that is sized to fit around insulator bushing equipment having an opening;
connecting at least a first face plate of a plurality of faceplates in the opening of the main body, the plurality of faceplates being interchangeable to connect to the main body and cover at least a portion of the opening,
connecting a second faceplate to the main body, wherein the first faceplate is connected adjacent the second faceplate to form a first opening having a first shape, wherein a third faceplate and a fourth faceplate of the plurality of faceplates are removably connectable to the main body, and wherein the third faceplate is connected adjacent the fourth faceplate to form a second opening having a second shape that is different than the first shape.

* * * * *